United States Patent
Berge et al.

(10) Patent No.: US 12,117,420 B2
(45) Date of Patent: Oct. 15, 2024

(54) SONAR SCANNING WATER COOLED COAXIAL CABLES

(71) Applicant: International Business Machines Corporation, Armonk, NY (US)

(72) Inventors: Layne A. Berge, Rochester, MN (US); Matthew Doyle, Chatfield, MN (US); John R. Dangler, Rochester, MN (US); Thomas W. Liang, Rochester, MN (US); Jason J. Bjorgaard, Rochester, MN (US); Kyle Schoneck, Rochester, MN (US); Matthew A. Walther, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 17/217,592

(22) Filed: Mar. 30, 2021

(65) Prior Publication Data
US 2022/0317092 A1    Oct. 6, 2022

(51) Int. Cl.
*G01N 29/26* (2006.01)
*G01N 29/44* (2006.01)
(Continued)

(52) U.S. Cl.
CPC ......... *G01N 29/26* (2013.01); *G01N 29/4445* (2013.01); *H01B 11/1882* (2013.01); *H01B 11/1895* (2013.01); *G06N 10/00* (2019.01)

(58) Field of Classification Search
CPC .... G01N 29/26; G01N 29/4445; G01N 29/11; H01B 11/1882; H01B 11/1895; Y10T 29/49014
See application file for complete search history.

(56) References Cited

U.S. PATENT DOCUMENTS 3,800,062 A * 3/1974 Kataoka ............... H01B 7/29
                                                    165/172
3,946,141 A   3/1976 Schmidt
(Continued)

OTHER PUBLICATIONS

Farid et al., "Review of Recent Patents Related to Electrical Cable Cooling," Recent Advances in Electrical & Electronic Engineering, Nov. 2009, 9 pages, https://www.researchgate.net/publication/228899983.

(Continued)

*Primary Examiner* — Donghai D Nguyen
(74) *Attorney, Agent, or Firm* — Kimberly Zillig (57) ABSTRACT

A system, apparatus, and method for determining ultrasonic vital product data of coaxial cables and side-band communications through a water medium of a water-cooling system and/or apparatus. The system may include a first electronic device. The system may also include a second electronic device. The system may also include one or more cables running between the first electronic device and the second electronic device. The system may also include a water jacket filled with water encasing the one or more cables. The system may also include one or more transducers connected to the water jacket, the one or more transducers configured to send signals through the water to gather information about each cable. The system may also include a computer system connected to the one or more transducers, where the computer system is configured to control the one or more transducers.

7 Claims, 8 Drawing Sheets

(51) Int. Cl.
  *H01B 11/18*    (2006.01)
  *G06N 10/00*    (2022.01)

(56) References Cited

U.S. PATENT DOCUMENTS

| | | | |
|---|---|---|---|
| 3,950,606 | A | 4/1976 | Schmidt |
| 3,955,042 | A | 5/1976 | Kellow et al. |
| 5,442,131 | A | 8/1995 | Borgwarth |
| 5,461,931 | A | 10/1995 | Gill |
| 5,723,773 | A | 3/1998 | Bryan |
| 6,065,350 | A | 5/2000 | Hill et al. |
| 7,081,586 | B2 * | 7/2006 | Rehrig .................. B23K 9/323 |
| | | | 174/15.1 |
| 7,453,041 | B2 * | 11/2008 | Maguire ................ H01B 12/16 |
| | | | 174/15.4 |
| 8,694,271 | B2 | 4/2014 | Dam |
| 9,354,094 | B2 | 5/2016 | Sinha |
| 9,388,975 | B2 * | 7/2016 | Wenger ................ H01Q 13/203 |
| 10,453,592 | B1 * | 10/2019 | Smith .................... H01B 12/16 |
| 10,571,535 | B2 | 2/2020 | Takayasu |
| 2011/0137585 | A1 | 6/2011 | McGill, Sr. |

OTHER PUBLICATIONS

"SWCC Water-Cooled Cable," Contribution to Optimum Operation of Electric Furnace, SWCC Group, Printed Mar. 29, 2021, 8 pages, https://www.swcc.co.jp/eng/products/pdf/water-cooled%20cable.pdf.

"Microelectronics," Nordson Sonoscan, Printed Mar. 29, 2021, 9 pages, https://sonoscan.com/applications/microelectronics.

"Water Cooled Coaxial Cable," Ampac, Printed Mar. 29, 2021, 2 pages, https://www.ampacremscheid.de/en/products/flexible-connecting-technology/water-cooled-high-current-cable/water-cooled-coaxial-cable/.

"CCSMA18-MM-086F-72," Digi-Key Electronics, Printed Mar. 29, 2021, 4 pages, https://www.digikey.be/product-detail/en/crystek-corporation/CCSMA18-MM-086F-72/744-1420-ND/2641968.

"Coaxial cable," Wikipedia, Printed Mar. 29, 2021, 28 pages, https://en.wikipedia.org/wiki/Coaxial_cable##/media/File:Coaxial_cable_cutaway.svg.

"Know About FSK Modulation and Demodulation with Circuit Diagram," EL-PRO-CUS, Printed Mar. 29, 2021, 8 pages, https://www.elprocus.com/fsk-modulation-demodulation-circuit-diagram/.

* cited by examiner

SONAR SCANNING WATER COOLED COAXIAL CABLES

BACKGROUND

The present disclosure relates to water-cooling coaxial cables and, more specifically, to determining ultrasonic vital product data (i.e., vital product data that is accessible ultrasonically) and side-band communications through the water medium.

In quantum systems, there are often large amounts of coaxial cables (for example, hundreds or thousands of cables) that connect the quantum electronics with other electronics. Quantum systems and/or electronics (for example, quantum computers) may need to be executed and operated in cryogenic conditions, as quantum bits (qubits) need extreme cold temperatures to operate and survive, superconductors may need the extreme cold to exhibit certain behaviors, and the small size of the technology may generate more heat so the extreme cold may prevent overheating. In quantum systems, coaxial cables may connect the cryogenic electronics (i.e., electronics at cryogenic temperatures) to other non-cryogenic electronics, such as room temperature electronics. The room temperature electronics (or other non-cryogenic electronics) may include various sensors, signal convertors, etc. that interact with the cryogenic electronics (cryo electronics).

SUMMARY

The present invention provides a system, apparatus, and method to determine ultrasonic vital product data (VPD) of coaxial cables and side-band communications through a water-cooling medium. The system may include a first electronic device. The system may also include a second electronic device. The system may also include one or more cables running between the first electronic device and the second electronic device. The system may also include a water jacket encasing the one or more cables, where the water jacket is filled with water. The system may also include one or more transducers connected to the water jacket, where the one or more transducers are configured to send signals through the water to gather information about each cable of the one or more cables. The system may also include a computer system connected to the one or more transducers, where the computer system is configured to control the one or more transducers The water-cooling apparatus may include one or more cables. The water-cooling apparatus may also include a water jacket encasing the one or more cables, where the water jacket is filled with water, the water surrounding the one or more cables. The water-cooling apparatus may also include a first water-tight interface at a first end of the water jacket. The water-cooling apparatus may also include a second water-tight interface at a second end of the water jacket. The water-cooling apparatus may also include one or more transducers connected to the water jacket, where the one or more transducers are configured to send signals through the water to gather information about each cable of the one or more cables.

The method may include receiving initial cable data. The method may also include transferring signals through a water-cooling apparatus. The method may also include receiving resulting signals, resulting in received signals. The method may also include analyzing properties of the received signals. The method may also include determining whether the properties of the received signals deviate from expected signal data of the received signals based on the analyzing and the initial cable data. The method may also include determining whether there are any apparent issues with one or more cables, where the one or more cables are within the water-cooling apparatus.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to water-cooling coaxial cables and, more specifically, to analyzing information about the coaxial cables and determining ultrasonic vital product data and side-band communications through the water medium. While the present disclosure is not necessarily limited to such applications, various aspects of the disclosure may be appreciated through a discussion of various examples using this context.

In certain computer systems such as quantum computing systems, there are components of the system that are only operable in extremely cold temperatures. However, other components of the system may only be operable in more normal temperatures, such as room temperatures. Coaxial (coax) cables may be used to connect various electronics/components and may bring a single signal across from one point to another. Put differently, each coaxial cable (also referred to herein as a "coax cable") may bring a single signal at a time between components, in some instances. In quantum computing, cables (such as coax cables) may be used to connect electronics that are in cryogenic (i.e., extremely cold) temperatures (cryo electronics) to electronics not in cryogenic temperatures. For instance, sensors, signal converters, and other electronics may be stored in room temperature and they may be connected, via coax cables, to quantum cryo electronics (i.e., quantum electronics in cryogenic temperatures). In some instances, the amount of cables connecting the quantum cryo electronic(s) to other electronics may be linearly dependent on the number of quantum bits (qubits) in the quantum system. For example, each qubit may correspond to a single coax cable, as each cable may transport a single signal. However, this may result in a large number of cables, and it may be difficult to determine what kind of condition each cable is in, which cable is which, which cable is where, whether the cables are in their proper positions, etc.

Additionally, quantum electronics may be extremely sensitive to temperature and may not run or execute properly if the electronics are not executed in a very specific temperature (for instance, electronics may not run properly if the temperature is off by even a couple tenths of a degree). As discussed above, quantum electronics (or at least components of quantum electronics) may need to be executed in cryogenic temperatures in order to operate properly and avoid overheating the electronics. However, even the temperature (for example, temperature of quantum bits (qubits)) being exchanged between the room temperature electronics and the cryogenic electronics (cryo electronics) may need to be a very specific temperature. For example, qubits may be affected, may not function properly, and/or may not even survive if the temperature is too warm (for example, above room temperature). Additionally, in some instances, because quantum computing is so small in size it may generate a lot of heat (which may be one of the reasons why quantum computing is often executed in cryogenic temperatures). Therefore, transferring data (for example, the qubits) from the quantum electronics may generate a lot of heat, which may overheat the cables, affect the room temperature sensors, and/or it affect the cryo electronics (for instance, by overheating them). Therefore, the data being exchanged through the cables and between the cryo electronics and other electronics, as well as the cables themselves, may also be very sensitive to temperature (i.e., need to operate at very specific temperatures).

In some instances, the quantum system may have extremely sensitive temperature requirements in order to operate, and the cables running between the quantum electronics (in cryogenic temperatures) and the other electronics may affect the temperature of the quantum electronics, which may cause inaccurate results within the cryo electronics, overheated cryo electronics, and/or even an overheated quantum system as a whole. This may lead to serious issues for the quantum system due to the extreme sensitivity to temperature. For example, the cables may need to be within a 0.2 degree Celsius temperature range in order to prevent any issues with the cryo electronics. Any slight change in the temperature of the room may cause the cables to overheat, or change more than 0.2 degrees Celsius, which could affect the signals being transmitted through the cables and the quantum system as a whole.

Additionally, as coax cables may often transport only a single signal at a time, there may be a large amount or large plurality of coax cables (e.g., hundreds or thousands of cables) connecting cryo electronics to room temperature electronics. The large amount of cables may affect the temperature around the cables (for example, that many cables close together may heat up the room and may heat each of the cables (at least a small amount such as 0.2 degrees Celsius) which may affect the quantum system (discussed above)).

Further, with the large amount of cables close together, it may be very difficult to identify each cable and determine when various cables are having issues. For instance, if certain data is not being transported properly, or even at all, between the cryo electronics and the room temperature electronics it may be difficult to diagnose which cable(s) are causing the issue and the system may need to be entirely shut down and taken apart in order to look through each cable, and identify which cable(s) are causing issues. For example, one cable in the middle of a bundle of thousands of cables may have a kink in the cable (or may not be properly connected to either the cryo electronics or the room temperature electronics) which may prevent the data being transmitted through the one cable from reaching the cryo electronics and/or room temperature electronics. In this example, it may be determined that some of the data is not being transmitted properly. However, it may not be determined which cable is not transmitting the data properly without taking apart the system, analyzing each cable, and identifying the single cable with the kink in it. Further, even if the kinked cable is visible, details of the cable may not be known, therefore the system may still need to be taken apart to determine the details of the cable. For example, it may not be known what type of cable it is, what connectors the cable needs to have, etc.

The present disclosure provides a system, apparatus, and method for determining ultrasonic vital product data (VPD) of coaxial cables and side-band communications through a water-cooling medium. Vital product data is information about a product (in this instance, a cable) that is used identify and administer the product. For example, vital product data may include a serial number, model number, part number, configuration information, etc. The cables that connect the cryo electronics to other electronics (such as room temperature electronics) may be water-cooled in order to maintain temperature stability for the cables and help ensure that the cables not overheating. Additionally, the water-cooled cables may be connected to transducers that are able to gather data about the cables and diagnose which cables (or cable) are causing issues and/or data to not be transferred properly (for instance, due to a lack of proper connection, a health issue for the cable (i.e., whether the cable itself is in proper shape and/or is functioning properly), etc.).

Transducers convert energy and/or signals into other readable signals. In some instances, the transducers may send signals (e.g., sound signals, code pulses, or any other signals) through the water surrounding the cables. In some instances, the transducers may be ultrasonic transducers. Ultrasonic transducers may convert electrical energy (e.g., electric currents) into sound waves (e.g., ultrasonic pulses and signals), and these sound waves may be transmitted through the liquid surrounding the water-cooled cables in order to gather data about the cables. Further, the transducers may be able to gather resulting images of the cables through the sound waves and signals. In some instances, ultrasonic scanning (i.e., scanning performed using ultrasonic technology, such as ultrasounds) may be difficult to do through air, but may be much easier to do, and may have a better resolution, when performed through a liquid. Therefore, in addition to water being used to water-cool the cables so that they maintain a proper temperature, the transducers may use the water as a medium to perform scanning through. Through the scanning (e.g., ultrasonic scanning) and the resulting imaging, the transducers can learn information about the cables (such as the physical health of the cables (e.g., whether there are any kinks, tears, or any other issues with the cable) and functioning of the cables) by analyzing the images and how the signal changes over time. For example, the signals may change over time through changes in magnitude and/or phase changes when interacting with a bent and/or broken cable as opposed to a cable in good health.

In some instances, there are at least two transducers and the transducers send and receive sideband communications. Sideband communications may be low-speed, low-data rate interfaces. The sideband communications may carry information about the cables or other system information. Specifically, a transducer may send out a signal through the water medium and one or more sideband communications may be sent. These sideband communications may return (for instance, as signals) to one or more of the transducers.

In some instances, each cable may have small unique physical structures on a surface of the cable that act as identifiers (for example, vital product data (VPD) such as a serial number) for each cable. The unique physical structures may be detectable through signals sent through the water. In some instances, such as when the transducers use ultrasonic signals and/or ultrasound technology, the signals may be used to produce imaging of the unique physical structures and the cables as a whole. Through the imaging and the unique physical structures, each cable may be individually identifiable while the equipment is still operating, as opposed to having to shut down the equipment, take apart the water-cooling apparatus, and manually read a serial number off of a cable. For instance, the unique physical structures of each cable may be documented or noted prior to the cables being placed in the water jacket, therefore when the signals are later sent through the water and the cables are later imaged, they can be compared to the documented unique physical structures to find their match and identify the cable.

Additionally, information about the cables such as the type of cable, the type of connectors at the ends of the cables, etc. (and the documented unique physical structures) may be stored on a computer system connected to the transducer(s), and when a cable is scanned and imaged, the computer system may not only match and identify the cable but may also know additional information (such as the cable type, connectors, etc.). This additional information may help a user and/or the system choose a cable to replace a current cable, may help understand how to repair the cable, etc. In some instances, the resulting imaging that the computer system generates based on the signals may show all the portions of the cable that are in the water, therefore (from the imaging) the cable may not only be identified, but its specific positioning in the system (for example, compared to other cables) may be known.

For example, a couple cables may have been in operation for 5 years and it may be time to replace those couple cables. However, if those couple cables are part of a bundle of thousands of coax cables, it may be extremely difficult to identify which couple cables need to be replaced. Therefore, in this example, if each cable has unique physical structures that distinguish each cable from the other thousand cables, the transducers can send signals (such as ultrasonic signals) through the water and around the cables, and use the resulting imaging of the cables and their unique physical structures to find the locations of the two cables that need replacing. With the locations of the two specific cables now known, in this example, these two cables may be replaced with no disruption (or at least a significantly smaller amount of disruption) to the other cables and the system as a whole (as the other cables may not need to be shifted and/or disconnected in order to figure out where the couple cables are located).

Further, if there are any abnormalities or irregularities in any of the cables, the signals may change (for example, wavelength changes, magnitude changes, amplitude changes, phase changes, or other signal property changes) because they may bounce off of the abnormalities/irregularities differently than they would bounce off the cable typically. The transducers may detect these signal changes, and (through the signal changes and imaging) may identify any issues with any of the cables. For example, the system may determine that certain data is not being transmitted properly from the cryo electronics to the room temperature electronics. In this example, instead of turning off the equipment and disrupting each cable to identify a kink, break, or other issue with the cable, the transducers may send signals through the water and use the resulting imaging to identify which specific cable (from the thousand cables) is causing the issue. For instance, a cable may have a kink, a cable may be completely split and/or broken, a connection between a cable and the cryo electronics and/or the room temperature electronics may have been displaced or disconnected, etc. The resulting imaging from the signals sent through the water may show these issues and isolate the cable that has the issue. Further, in this example, even when the cable with the issues has been detected, the details of the cable may not be known (such as what kind of connectors the cable needs to have, what gender each connector is, whether the cable needs to be a specific type of cable, etc). Therefore, in this example, the transducer can also detect the VPD (e.g., the serial number) of the specific cable through its unique physical structures, and the VPD can be used to determine the type of cable, the connectors that the cable uses, etc. For instance, as discussed above, the unique physical structures and other information about the cables may be documented and stored prior to the cables being set up and used. Therefore, when a cable is later having an issue, the unique physical structure(s) detected via the imaging can be compared to the stored unique physical structures to identify the cable and determine the information about the cable. The system and/or a user may use this information to determine how to repair the cable and/or what cable to replace it with.

In another example, the system may not yet have determined that data is not being properly transmitted. In this example, the transducers may be routinely transmitting signals throughout the water and may be monitoring the resulting signals that are received back. Specifically, the transducers may be monitoring for abnormalities that are not expected for the signals. In this example, the transducers may detect wavelengths that are shorter than expected (i.e., wavelengths that have changed from past wavelengths). This may indicate that there is an issue with the cable. In response to the change in wavelength, the transducers may generate images of the cables from the signals. In some instances, the transducers may always generate images from the resulting signals. In some instances, as in this example, the transducers may periodically generate images or may generate images only when there are signals that suggest issues with the cable. In this example, the transducer uses the generated images to determine whether any of the cables have any issues. Here, the imaging may show a cable that has snapped in the middle, and the imaging may be used to determine the VPD of the snapped cable (through the unique physical structures) so that it can be determined which cable should be used as a replacement cable to fix the issue. In some instances, the imaging may only show the cable within the water, and a user and/or the system may trace the cable and use the positioning of the cable within the water to determine the connectors of the cable (for instance, the portion of the cable outside of the water medium). In some instances, when setting up the system, a user may document (for example, on a computer system connected to the transducer(s)) the connection locations of each cable. Put differently, the specific connection points of a cable may be known and documented. In these instances, once the unique physical structures of the cable having issues are determined, the connection points/locations may be determined through the documentation on the computer system.

Being able to identify and monitor each individual cable connecting the cryo electronics to other electronics may help the system identify each cable in a large amount of cables, more accurately identify and diagnose any issues with the cables (for example, kinked and/or broken cables) and may help isolate any issues to a small amount of cables, or even a single cable, that actually need repairing and/or replacing so that a minimal amount of cables need to be disturbed in order to fix an issue.

Figure 1:
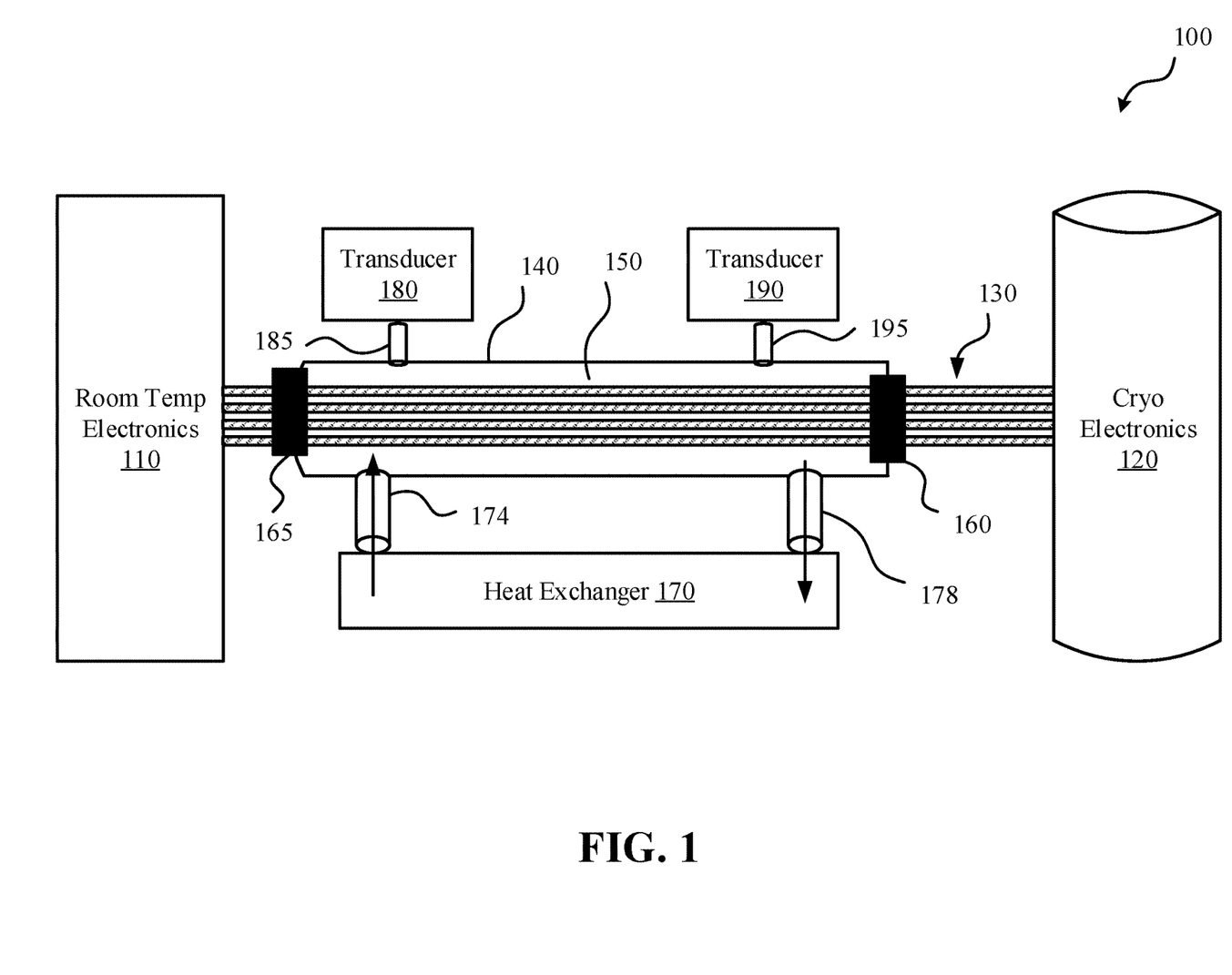
FIG. 1 depicts a schematic diagram of a first example water-cooling system, according to some embodiments.

Referring now to FIG. 1, a schematic diagram of an example water-cooling system 100 is depicted, according to some embodiments. Water-cooling system 100 includes cryo electronics 120 (for example, quantum electronics) and room temperature electronics 110 (for example, signal convertors, sensors, etc.). In some embodiments, cryo electronics 120 may include a plurality of electronics in cryogenic temperatures and room temperature electronics 110 may include a plurality of electronics in room temperatures (for example, somewhere between 10-30 degrees Celsius). Cables 130 (for example, coax cables) connect the cryo electronics 120 to the room temperature electronics 110. As discussed herein, these cables 130 may be very temperature sensitive and may need to maintain a very specific temperature. Therefore, these cables 130 may be water-cooled in order to maintain a consistent temperature (for example, within 0.2 degrees Celsius). To water-cool the cables 130, water-cooling system 100 includes a water jacket 140 encasing the cables 130 and two water-tight interfaces (water-tight interface 160 and water-tight interface 165) containing the water 150 within the water jacket 140 and preventing the room temperature electronics 110 and the cryo electronics 120 from being exposed to the water 150. In some embodiments, the water jacket 140 may have a metal sheath (for example, made of steel, brass, etc.). Although water-cooling and water (e.g., water 150) are discussed herein, coolants or other types of liquids may also be used to cool the cables (e.g., cables 130) and to transmit signals through to gain information about the cables.

To water-cool the cables 130 and maintain a consistent temperature, the water jacket 140 is connected to a heat exchanger 170 via ports 174 and 178. In water-cooling system 100, the water in the water jacket 140 may transfer out to the heat exchanger 170 through port 178 and new water may transfer into the water jacket 140 through port 174. This is just one exemplary format of water 150 being exchanged (through heat exchanger 170) from the water jacket 140 in order to maintain a consistent temperature. The heat exchanger 170 may include a temperature sensor and may monitor and maintain the temperature of the water 150 inside the water jacket 140. Water may need to be exchanged because the water 150 inside the water jacket 140 may be heated by the cables, therefore new water may need to be transferred in in order to prevent a temperature increase of the cables 130.

Water jacket 140 is also connected to two transducers 180 and 190. Although two transducers 180 and 190 are depicted here, any number of transducers may be connected to the water jacket 140. In some instances, transducers 180 and 190 are ultrasonic transducers that send ultrasonic signals through the water 150. In water-cooling system 100, transducer 180 is connected to the water jacket 140 through a transmission (TX) port 185 and transducer 190 is connected to the water jacket 140 through a receiver (RX) port 195. In this instance, transducer 180 may send signals (such as sound waves) into the water 150 through the TX port 185 and transducer 190 may receive the signals (for example, after they have interacted and bounced off of the cables 130). In some instances, discussed further herein (for example, in FIG. 5 and FIG. 6), these received signals may help identify, monitor, and diagnose each of the cables 130. Although transducers 180 and 190 are depicted on top of water jacket 140, transducers 180 and 190 may be located anywhere in water-cooling system 100, as long as they are able to send and receive signals through the water 150. For example, transducers 180 and 190 may be next to water-tight interfaces 165 and 170 on the sides of water jacket 140. In some instances, transducer 180 may transmit signals to transducer 190 (or vice versa). In some instances, transducer 180 may send signals, the signals may be reflected, and transducer 180 may receive the reflected signals. Similarly, transducer 190 may send its own set of signals and may receive reflected signals.

In water-cooling system 100, a plurality of cables 130 are depicted between cryo electronics 120 and room temperature electronics 110, however any number of cables may connect the electronics.

Figure 2:
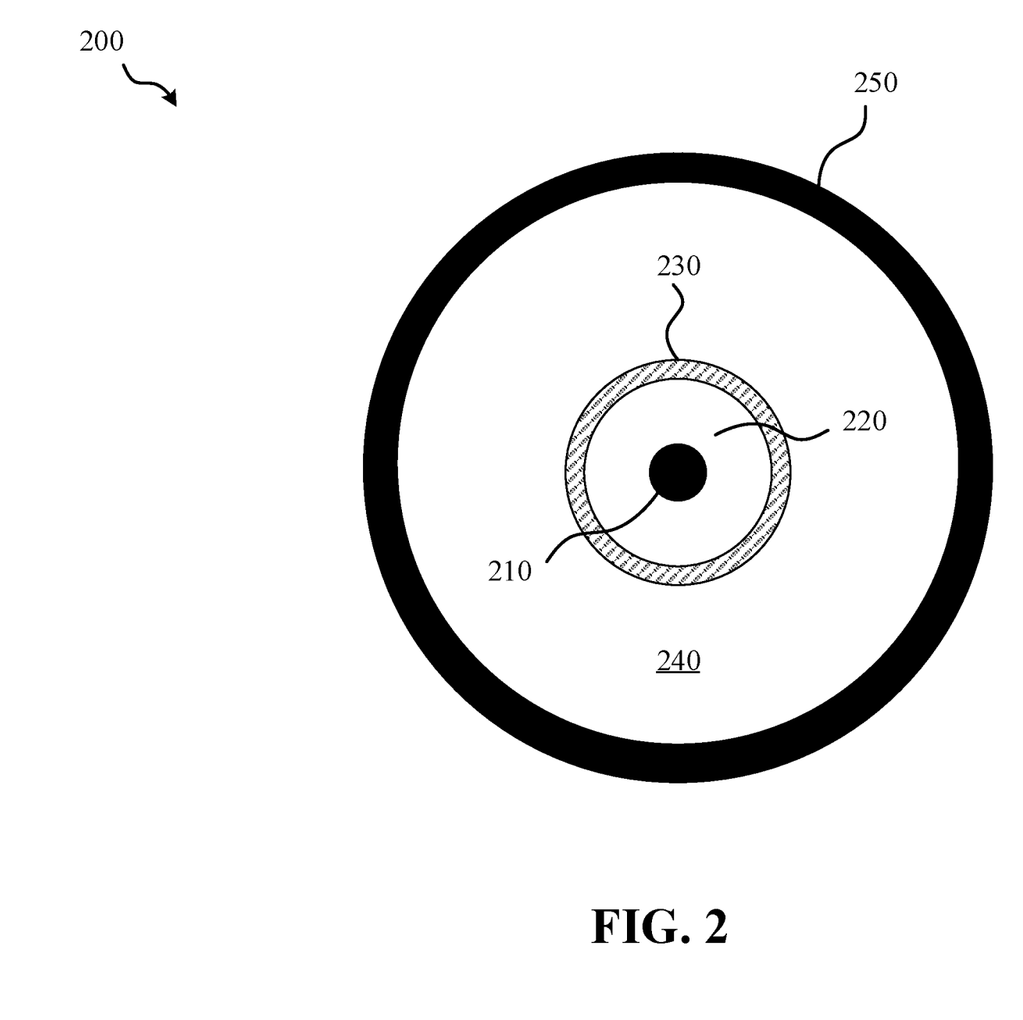
FIG. 2 depicts a schematic diagram of a cross-sectional view of a water jacket with a single cable, according to some embodiments.

Referring to FIG. 2, a schematic diagram of a cross-sectional view 200 of a water jacket 250 with a single cable is depicted, according to some embodiments. The water-cooling system 100 of FIG. 1 depicts a plurality of cables 130 between cryo electronics 120 and room temperature electronics 110, however, in some instances, a single cable may connect cryo electronics 120 and room temperature electronics 110. In some embodiments, cross-sectional view 200 may be the cross-section of water-cooling system 100. In cross-sectional view 200, the single cable includes an inner conductor core 210 (such as a copper core). The inner conductor core 210 is surrounded by an insulator 220 to insulate electric currents being transmitted through the inner conductor core 210. In some embodiments, the insulator 220 may be a plastic (such as polyvinyl chloride (PVC) or polyethylene (PE)) or any other insulating material. Additionally, the single cable includes an outer sheath 230 (such as a plastic sheath) to protect the cable. To water-cool the cable, the cable is surrounded by a water jacket 250 (for example, corresponding to water jacket 140 (FIG. 1)) encasing water 240.

Figure 3:
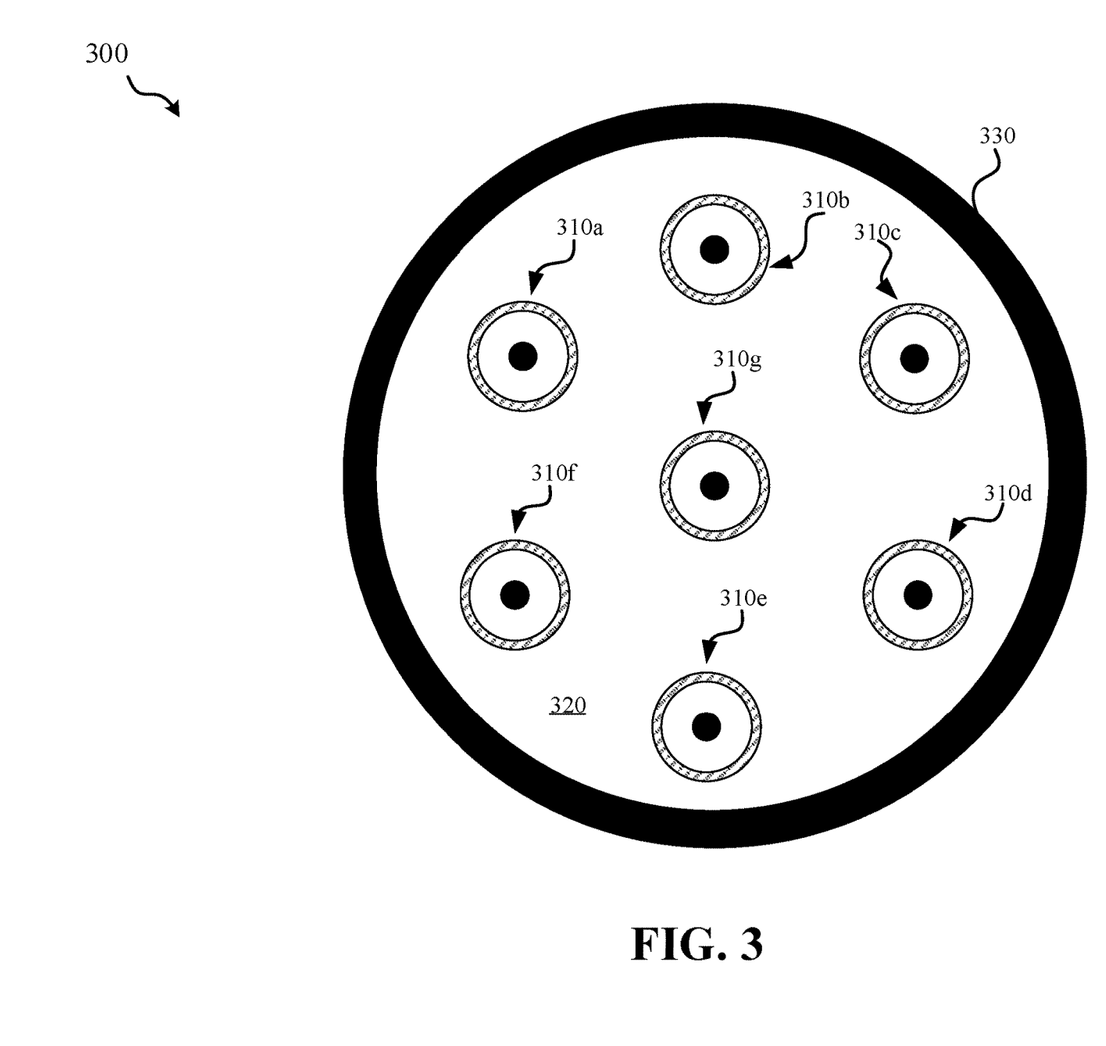
FIG. 3 depicts a schematic diagram of a cross-sectional view of a water jacket with a plurality of cables, according to some embodiments.

Referring to FIG. 3, a schematic diagram of a cross-sectional view 300 of a water jacket 330 with multiple cables 310 is depicted, according to some embodiments. In some embodiments, cross-sectional view 300 may be the cross-section of water cooling system 100. In some instances, cables 130 (FIG. 1) may correspond to cables 310. In this instance, a water jacket 330 surrounds a plurality of cables 310a, 310b, 310c, 310d, 310e, 310f, and 310g (referred to collectively as cables 310). The water jacket 330 encases water 320, and the water 320 surrounds each of the cables 310. Each cable 310 may include an inner conductor core, an insulator, and an outer sheath (discussed herein and depicted in FIG. 2).

Figure 4:
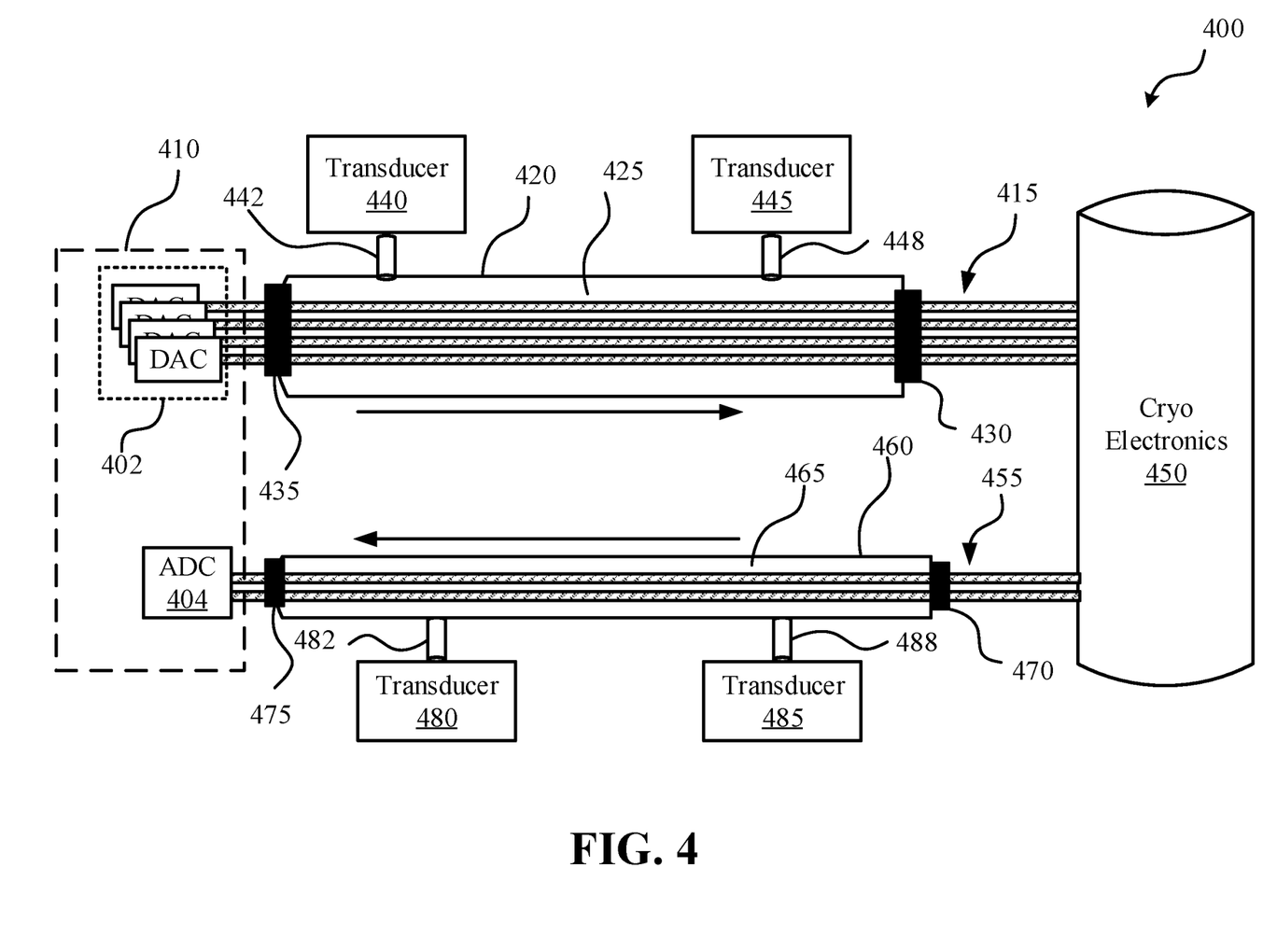
FIG. 4 depicts a schematic diagram of a second example water-cooling system, according to some embodiments.

Referring to FIG. 4, a schematic diagram of an example water-cooling system 400 is depicted, according to some embodiments. In some instances, as depicted in FIG. 4, a water-cooling system includes separate water jackets 420 and 460 for separate groupings of cables 415 and 455. For instance, as depicted in FIG. 4, cables 455 connect the cryo electronics 450 to an analog-to-digital converter (ADC) 404 and cables 415 connect to digital-to-analog converters (DACs) 402. In some instances, the cables 415 may transmit data from the DACs 402 to the cryo electronics 450 and the cables 455 may transmit data from the cryo electronics 450 to the ADC 404. DACs 402 and ADC 404 may be room temperature electronics 410.

Water jacket 420 surrounds cables 415, with water-tight interfaces 430 and 435 separating the water 425 from the DACs 402 and the cryo electronics 450. The water jacket 420 may be connected to transducer 440 and transducer 445 through ports 442 and 448, respectively. The transducers 440 and 445 may send signals through the water 425 to gather information about and to monitor the cables 415. In some instances, the water jacket 420 may also be connected to a heat exchanger (not depicted) similar to heat exchanger 170 (FIG. 1).

In water-cooling system 400, water jacket 460 surrounds cables 455, with water-tight interfaces 470 and 475 separating the water 465 from the ADC 404 and the cryo electronics 450. The water jacket 460 is connected to transducer 480 and transducer 485 through ports 482 and 488, respectively. The transducers 480 and 485 may send signals through the water 465. In some instances, the water jacket 460 may also be connected to a heat exchanger (not depicted) similar to heat exchanger 170 (FIG. 1). In some instances, water jacket 420 and water jacket 460 may be connected to the same heat exchanger.

Figure 5:
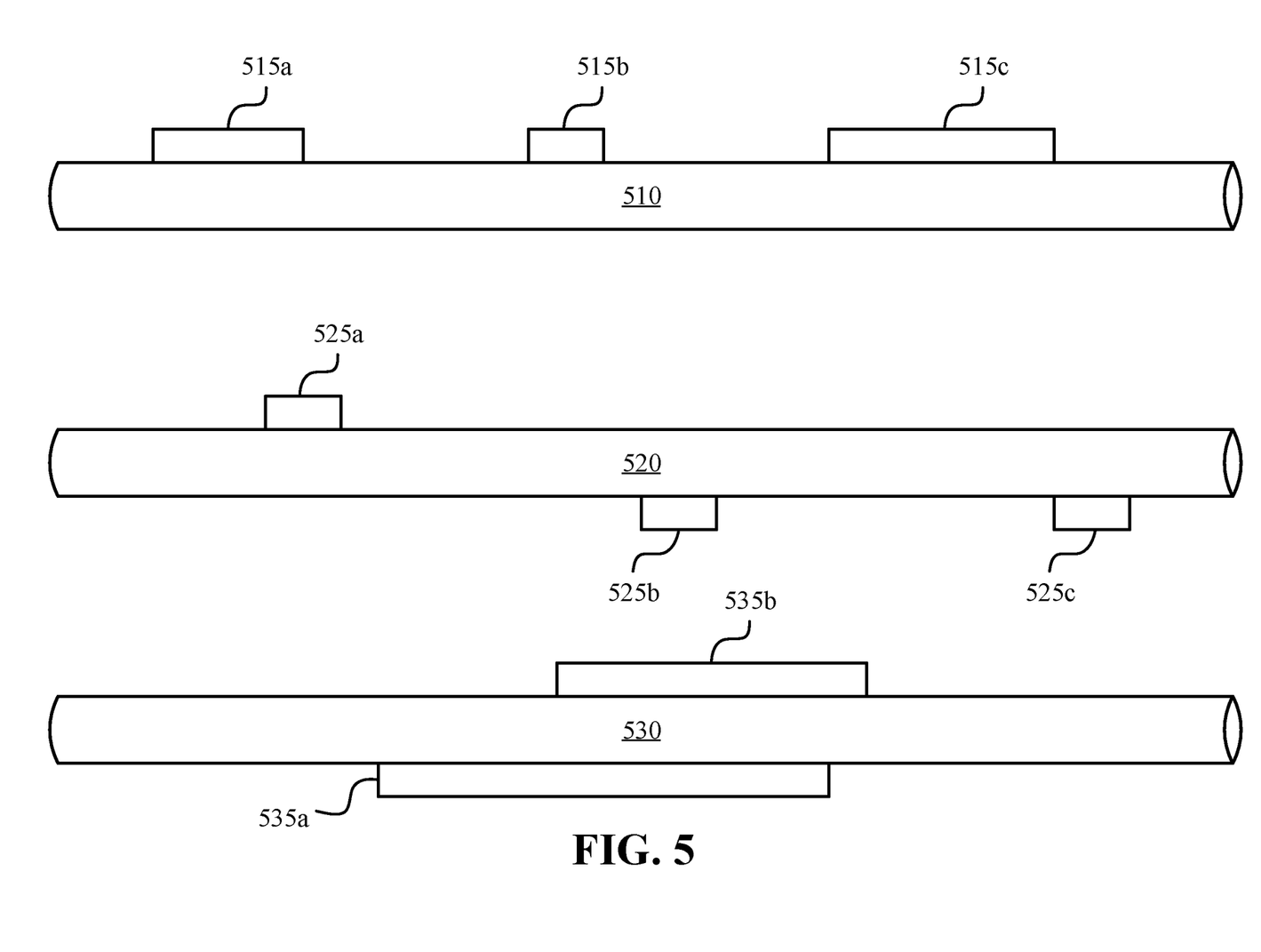
FIG. 5 depicts a schematic diagram of cables with unique physical structures, according to some embodiments.

Referring to FIG. 5, a schematic diagram of cables with unique physical structures is depicted, according to some embodiments. Cable 510 includes unique physical structures 515a, 515b, and 515c (referred to collectively as unique physical structures 515), cable 520 includes unique physical structures 525a, 525b, and 525c (referred to collectively as unique physical structures 525), and cable 520 includes unique physical structures 535a and 535b (referred to collectively as unique physical structures 530). In some embodiments, each cable (for example, connecting room temperature electronics to cryo electronics) has unique physical structures that distinguish each cable from the others. These unique physical structures (e.g., unique physical structures 515, 525, and 535) can be used to uniquely identify each cable (for instance, similar to a serial number) and, in some instances, may be considered VPD for each cable. In some embodiments, the unique physical structures are micro peaks and/or valleys with different groves, heights, etc. on the sheath of each cable. For instance, cable 510 has three different sized structures 515 on a same/similar side of the cable, cable 520 has three similar sized structures 525 with two (525b and 525c) on a similar size of the cable 520 and one (525a) on an opposite side of the cable, and cable 530 has two different sized structures 535 on opposite sides of the cable 530.

In some instances, the transducers connected to the water jacket (for example, transducers 180, 190 (FIG. 1), 440, 445, 480, 485 (FIG. 4), 610, and/or 620 (FIG. 6)) send signals (such as sound signals) through the water (not depicted) surrounding the cables 510, 520, and 530 and create resulting images of the cables. The unique physical structures 515, 525, and 535 of cables 510, 520, and 530 are detected through the signals and the resulting imaging, which allows each individual cable to be identified. For instance, the unique physical structures of each cable may be documented or noted prior to the cables being placed in the water jacket, therefore when the cables are later imaged, they can be compared to the documented unique physical structures to find their match and identify the cable. Further, the transmitted signals and resulting imaging can help check the locations of each cable in the bundle (for example, cable bundle 130 (FIG. 1)) through the resulting imaging. Specifically, the signals transmitted through the water may be used to generate images (through the transducer(s)) of the cables. Through these images, it may be visible whether the cables are connected.

Additionally, because of the unique physical structures 515, 525, and 535, the transducer may be able to identify which cable is which, and therefore it may be determined whether there are any kinks or breaks in the cable (discussed further herein) and/or whether each cable is connected properly. Being able to individually identify each cable in a cable bundle (especially when there may be hundreds or thousands of cables in a cable bundle) through the unique physical structures 515, 525, and 535 may help the system more easily monitor each cable, isolate any incidents or issues with the cables, and repair the system (as the cables may be able to be repaired/replaced individually, instead of the entire system needing to be taken apart and analyzed in order to identify an issue).

Figure 6:
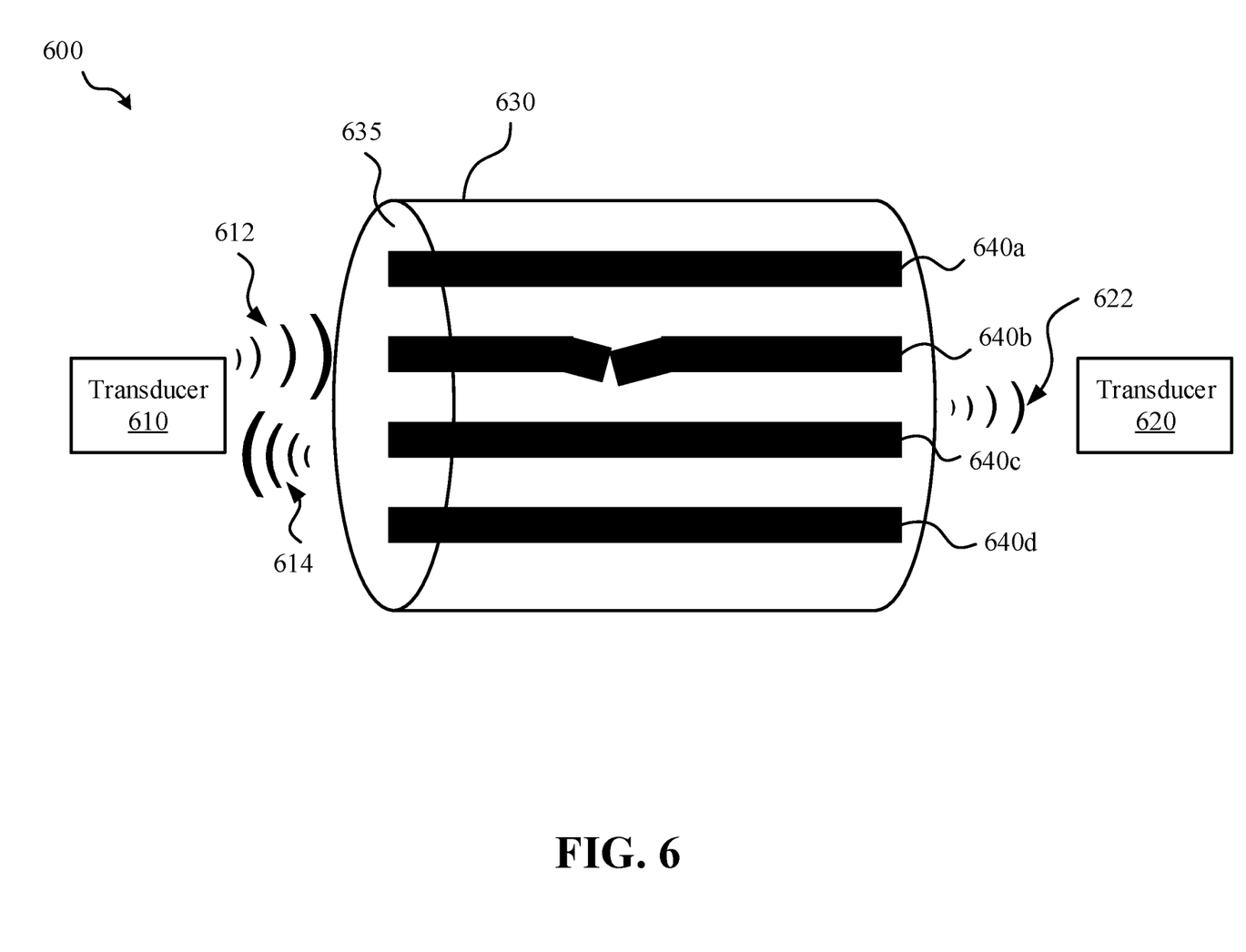
FIG. 6 depicts a schematic diagram of an example water-cooling apparatus, according to some embodiments.

Referring to FIG. 6, a schematic diagram of an example water-cooling apparatus 600 is depicted, according to some embodiments. Water-cooling apparatus 600 includes a transducer 610 and a transducer 620 on either end of a water jacket 630. The locations of transducers 610 and 620 are just exemplary locations of the transducers 610 and 620. For example, in some instances, the transducers 610 and 620 may be on a same side of the water jacket 630 (as depicted in FIG. 1). Inside the water jacket 630, there are cables 640a, 640b, 640c, and 640d (referred to collectively as cables 640) surrounded by water 635 to water-cool the cables 640. In some embodiments, cables 640 correspond to cables 130 (FIG. 1), cables 310 (FIG. 3), cables 415, cables 455 (FIG. 4), and/or cables 510, 520, and 530 (FIG. 5).

To detect whether any cables are damaged and monitor the health of each cable, transducer 610 sends signals 612 (such as sound waves) through the water 635. In some instances, transducer 620 receives the signals 622 after they have been transmitted through the water 635. In some instances, transducer 610 receives the signals 614 after they have been reflected back to the transducer 610. In this instance, transducer 620 may also transmit signals (not depicted) through the water 635 and may receive the reflected signals. In some embodiments, the transducers 610 and 620 consistently send and receive signals (such as signals 612, 614, and/or 622) through the water 635 to routinely monitor the health of the cables 640.

The transducers 610 and 620 may analyze the received signals (e.g., signals 614 and/or 622) for any changes, such as magnitude and/or phase changes of the signals. These changes may indicate an issue with one or more of the cables. For instance, the damage to cable 640b may change the magnitude and phase of the signals around/near this cable, and the signals received by transducer 620 may not be what the transducer 620 expected. For instance, the transducer 620 may have previous signal data received at an earlier time and/or the transducer 620 may compare the signal data around cable 640b to signal data from other areas of the water 635, such as near cable 640d. This data may be referred to as the expected signal data. If the signals received near cable 640b are much different than the signals received near cable 640d (for instance, the expected signal data), the different signals received near cable 640b may indicate that there is an issue with the cables near that area. For example, the transducers 610 and 620 may be routinely monitoring the cables and periodically sending signals through the water. In this example, the transducers 610 and 620 may compare the received signals to previous received signals (i.e., past signals of the cables that have been received by the transducers during the monitoring). Here, the kink in cable 640b may disrupt the phases of the signal and may cause the phase to end (and a new phase of a different size to begin) when the signal hits the kink in the cable 640b. Further, in this example, the wavelength of the signals may become smaller after the signal interacts with the kink. These changes in the signal may be different than previous signal behaviors when the cable was intact, and the transducers 610 and 620 may flag the cable for potential issues.

In some embodiments, the transducers 610 and 620 may generate imaging of the cables 640 and/or the water-cooling apparatus 600 each time signals (612, 614, and/or 622) are transmitted through the water 635. In these instances, the transducers 610 and 620 may compare the imaging with previous imaging of the cables 640 to determine that the cable 640b is damaged. In some embodiments, the transducers 610 and 620 may not always generate imaging of the cables 640 when signals (612, 614, and/or 622) are transmitted. For instance, the signals may continuously be monitored to determine whether there is any unexpected signal data, but the imaging may only be generated in response to unexpected signal data. For example, once it is determined that the signals near cable 640b are different than the signals near cable 640d, transducer 610 and/or transducer 620 may generate resulting imaging (for example, ultrasound imaging) from the signals. This imaging may identify that it is cable 640b with the damage, and the imaging may also identify the VPD of cable 640b (for example, through unique physical structures). The VPD may help determine the specifics of cable 640b so that cable 640b can be replaced with minimal to no disruption to the other cables 640a, 640c, and 640d.

Being able to monitor the cables and detect issues with the cables, as well as to identify each cable to determine which type of cable has the issues, may help resolve any issues with the system (such as a quantum computing system) with a small amount of disruption to the other cables and the system as a whole. For example, a cable (or cables) may have been kinked or bent during installation, there may have been a malfunction with a cable and it may not be working properly, the cables may simply deteriorate over time and, in some instances, may not deteriorate at the same rate, there may have been an undetected rupture to the sheath of the cable prior to installation, etc. Further, in some instances, the small scale of quantum computing can generate a large amount of heat. This may result in the cables being exposed to more heat, which may lead to quicker deterioration of the cables. Additionally, in quantum computing, there is such a large amount of cables (e.g., hundreds or thousands) needed to connect cryo electronics to other (e.g., room temperature) electronics. In conventional systems, the entire system may need to be shut down and the cables may need to be displaced, examined, etc. to search for the cable(s) causing the issue. This may decrease the efficiency of the system as a whole. Therefore, being able to identify the cable and detect which cable(s) is having problems may prevent the entire system from being disrupted and may lead to quicker repair of the system.

Figure 7:
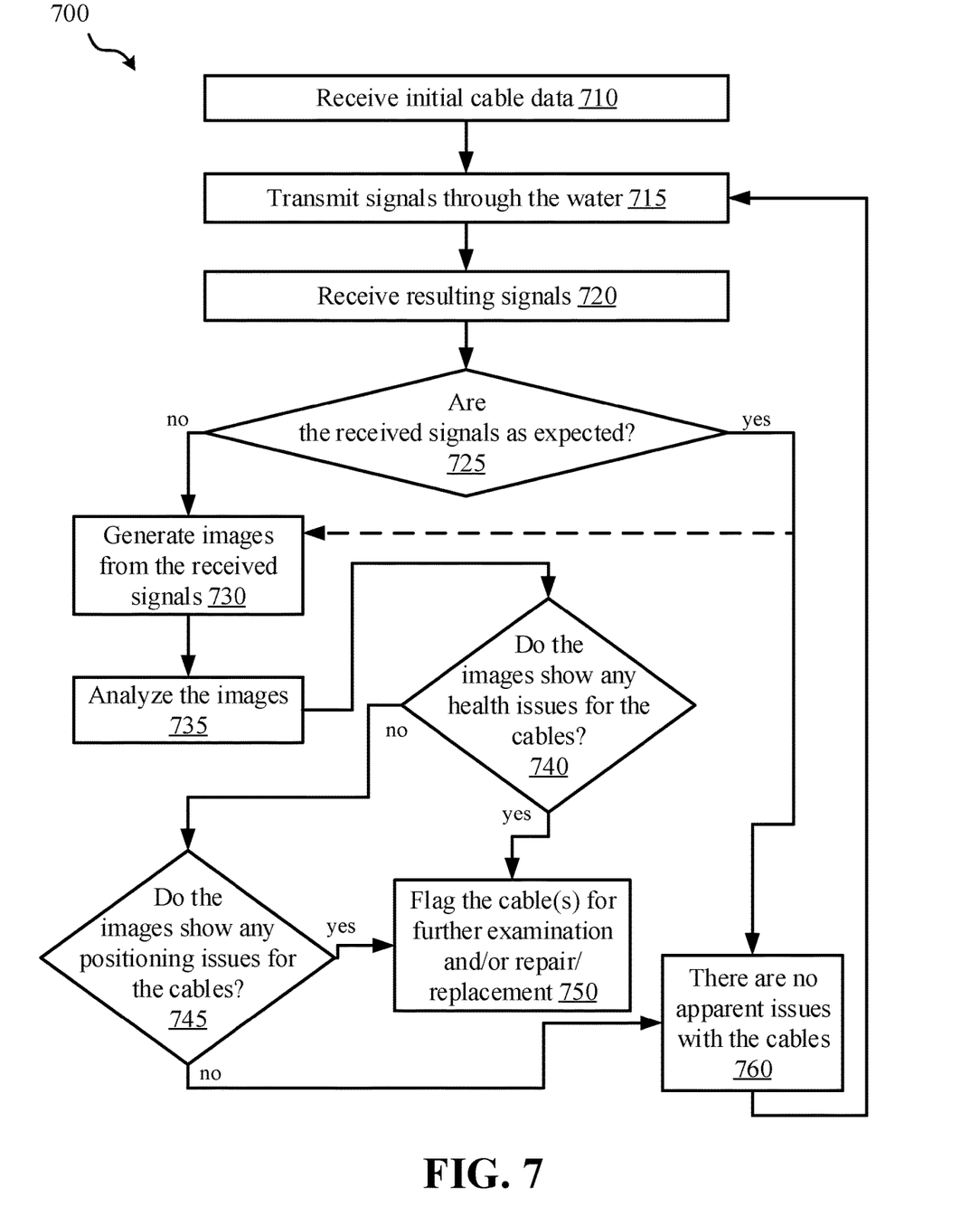
FIG. 7 depicts a flowchart of a set of operations for monitoring cables in a water-cooling interface, according to some embodiments.

Referring to FIG. 7, a flowchart of a method 700 for monitoring cables in a water-cooling environment is depicted, according to some embodiments. In some embodiments, method 700 is performed by a computer system (e.g., computer system/server 802) connected to one or more transducers (such as transducer 180, transducer 190 (FIG. 0.1), transducer 440, transducer 445, transducer 480, transducer 485 (FIG. 4), transducer 610, and/or transducer 620 (FIG. 6)).

Method 700 includes operation 710 to receive initial cable data. In some embodiments, to receive initial cable data, the computer system and corresponding transducer(s) performs an initial scanning (by transmitting signals through the water) and generates initial imaging of the cables. The initial scanning data (for example, the wavelengths, magnitudes, phases, etc. of the signals) may be used as expected signal data for the cables and may be used as a comparison point for future signal data. In some embodiments, initial schematics of the cables are created using the initial imaging of the cables. The initial schematics may be diagrams and/or representations of the initial positioning of the cables. In some embodiments, the initial cable data includes the documented unique physical structures for each cable. For example, a user may have gathered the unique physical structures for each cable and may input these structures into the computer system. In another instance, after the expected signal data and initial imaging has been gathered, a user may input details for each cable based on their unique physical structures. For example, a user may match their documented unique physical structures for a cable with the unique physical structures for a cable that are visible on the initial imaging. In this example, the user may input the type of cable and other data about the cable so that the computer system is able to access this information about the cables.

Method 700 includes operation 715 to transmit signals (e.g., sound signals) through the water and operation 720 to receive resulting signals. As discussed herein, signals may be transmitted through the water being used to water-cool the cables in order to monitor the cables. The signals may bounce off of the cables and may be received by a second transducer and/or may reflect back and be received by the same transducer who sent/transmitted the signals.

Method 700 includes operation 725 to determine whether the received signals are expected. In some embodiments, determining whether the received signals are expected includes comparing the received signals to the expected signal data to determine whether there are any differences between the two. If there are any differences, the receiving signals may not be as expected. For example, if a cable is kinked and/or broken, the received signals may bounce off of the kinked/broken part of the cable, which may result in signals that are shorter wavelengths than the expected signal data. In another example, if a cable has shifted to a different location and cables are more clumped together than usual, the signals may have a shorter amplitude and/or wavelength (for instance) compared to the expected signal data. In some embodiments, a user may manually examine the received signals and may input into the computer system whether the signals are as expected.

If, in operation 725, the received signals are not expected, method 700 proceeds to operation 730 to generate images from the received signals. As discussed herein, the transducer(s) and the computer system may use ultrasound technology or other imaging technology to generate imaging from the transmitted signals. Because the signals were transmitted through the water, the resulting imaging may have better imaging with improved resolution (as opposed to images generated from signals transmitted through air).

Method 700 includes operation 735 to analyze the images. In some embodiments, the generated images are analyzed by comparing the generated images to the initial images or schematics and determining whether there are any differences and/or discrepancies between them. For instance, the initial schematics may include positioning data and other cable specifications and therefore, using the initial schematics, it may be determined whether a cable is exhibiting expected behavior or unexpected behavior. For example, the cables may be bendable and some bend to the cables may be expected. Therefore, in this example, the initial schematics of the cables and/or other stored information about the cables may include a maximum expected bend angle. The maximum expected bend angle may be the maximum angle that the cable can be in and still be considered behaving expectedly. In this example, the cable may have a maximum expected bend angle of 45 degrees. If, in the generated images, a cable is bent more than 45 degrees, it may be determined that there are discrepancies between the initial schematics and the generated images. Discrepancies between the generated images and the initial schematics may indicate that there are issues with the cables.

Method 700 includes operation 740 to determine whether the images show any health issues for the cables. In some embodiments, when analyzing the images, the computer system may analyze the images of each individual cable for the condition of each cable as well as the positioning of the cables. Determining whether the images show any health issues for the cables may include examining the condition of each cable. For instance, the imaging for each cable may be examined and analyzed to determine whether there are any kinks, breaks, tears, or any other issues with the surface of the cables. These issues indicate that there are possible health issues with the cable (i.e., the cable is not in perfect health). If, in operation 740, the images show any health issues, the cables with the health issues are flagged for further examination, repair, and/or replacement in operation 750. In some embodiments, the cable with the identified issues may be flagged, and a user may then examine the imaging and the signals to determine whether there are actual issues with the cable and/or whether the cables need to be repaired or replaced. In some embodiments, the cables may be automatically flagged for repair or replacement, without user examination.

If, in operation 740, the images do not show any health issues, the images may be further analyzed to determine whether the images show any positioning issues for the cables in operation 745. For instance, even if the cable itself is still in good health (for example, there are no detectible issues with any the surfaces of any of the cables), the cable may have shifted over time and may be in an incorrect position (for instance, compared to the other cables in the bundle). In some instances, operation 745 occurs prior to operation 740 and/or simultaneous to operation 740. If, in operation 745, there are positioning issues for the cables, method 700 proceeds to operation 750 to flag the cable(s) for examination, repair, and/or replacement. In some instances, positioning issues with cables may be flagged for examination, but not repair and/or replacement. For instance, a cable in an incorrect position may not affect the functioning of the cables and may not need to be repaired or replaced. Therefore, in some instances, cables in improper positions may simply be flagged for further examination/inspection and a user may inspect the imaging to determine whether there will be any issues with the cable in its current positioning. If there are no issues, the user may indicate that the cable may remain in its current positioning. If there are issues with the cable in its current positioning, the user may indicate that the cable needs to be adjusted or even replaced.

If, in operation 745, there are no positioning issues for the cables, method 700 proceeds to operation 760 to determine that there are no apparent issues with the cables. When there are no apparent issues with the cables, the system may continue operating as usual. As discussed herein, the transducers and corresponding computer system may periodically and/or routinely monitor the cables and determine whether they have any issues. Therefore, even if there are no apparent issues with the cables at 760, method 700 may return to operation 715 to transmit more signals through the water to continue monitoring the cables.

If, in operation 725, the received signals are as expected, method 700 may proceed to operation 760 to determine that there are no apparent issues with the cable. In some instances, even if (in operation 725) the received signals are as expected, method 700 may still proceed to operation 730 to generate images from the received signals. For instance, it may be predetermined (for example, the user may adjust the settings) that images are generated from the received signals every time the signals have been transmitted, regardless of whether the signals received had the expected behavior and/or any discrepancies from the initial signals. For example, there may be a small tear in the sheath of the cable that does not affect the signals being transmitted through the water. However, in this example, the small tear in the sheath may expose the inside components of the cable to the water or may cause other issues with the cables. Analyzing the resulting images, even though the signals were as expected, may allow the tear in the cable to be discovered and prevent further issues with the system.

Figure 8:
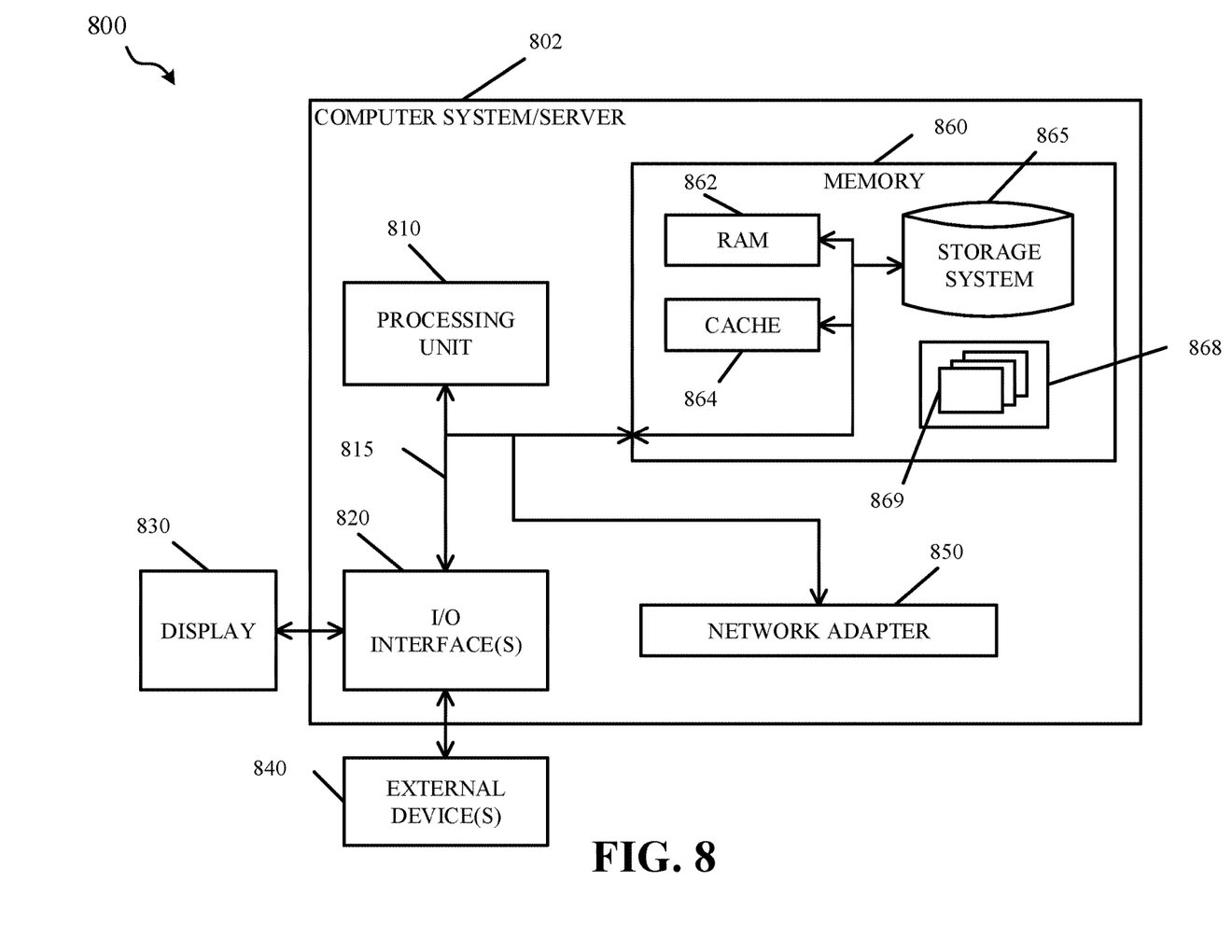
FIG. 8 depicts a block diagram of an example computer system environment, according to some embodiments.

Referring to FIG. 8, computer system 800 is a computer system/server 802 is shown in the form of a general-purpose computing device, according to some embodiments. In some embodiments, computer system/server 802 is located on the linking device. In some embodiments, computer system 802 is connected to the linking device. The components of computer system/server 802 may include, but are not limited to, one or more processors or processing units 810, a system memory 860, and a bus 815 that couples various system components including system memory 860 to processor 810.

Bus 815 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 860 can include computer system readable media in the form of volatile memory, such as random-access memory (RAM) 862 and/or cache memory 864. Computer system/server 802 may further include other removable/non-removable, volatile/non-volatile computer system storage media. By way of example only, storage system 865 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 815 by one or more data media interfaces. As will be further depicted and described below, memory 860 may include at least one program product having a set (e.g., at least one) of program modules that are configured to carry out the functions of embodiments of the disclosure.

Program/utility 868, having a set (at least one) of program modules 869, may be stored in memory 860 by way of example, and not limitation, as well as an operating system, one or more application programs, other program modules, and program data. Each of the operating system, one or more application programs, other program modules, and program data or some combination thereof, may include an implementation of a networking environment. Program modules 869 generally carry out the functions and/or methodologies of embodiments of the invention as described herein.

Computer system/server 802 may also communicate with one or more external devices 840 such as a keyboard, a pointing device, a display 830, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 820. Still yet, computer system/server 802 can communicate with one or more networks such as a local area network (LAN), a general wide area network (WAN), and/or a public network (e.g., the Internet) via network adapter 850. As depicted, network adapter 850 communicates with the other components of computer system/server 802 via bus 815. It should be understood that although not shown, other hardware and/or software components could be used in conjunction with computer system/server 802. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a first electronic device;
   a second electronic device;
   one or more cables running between the first electronic device and the second electronic device;
   a water jacket encasing the one or more cables, wherein the water jacket is filled with water;
   one or more transducers connected to the water jacket, wherein the one or more transducers are configured to send ultrasonic signals through the water to gather information about each cable of the one or more cables; and
   a computer system connected to the one or more transducers, wherein the computer system is configured to control the one or more transducers.

2. The system of claim 1, wherein:
   the one or more cables have one or more unique physical structures on a surface of each cable; and
   the one or more transducers are configured to read the one or more unique physical structures through the ultrasonic signals sent through the water.

3. The system of claim 2, wherein the one or more unique physical structures are vital product data for each cable.

4. The system of claim 1, wherein the one or more transducers are configured to perform ultrasonic scanning operations.

5. The system of claim 1, wherein the information about each cable of the one or more cables includes a health of each cable.

6. The system of claim 1, wherein the one or more cables comprise a plurality of cables, the system further comprising:
   a second water jacket encasing a second one or more cables from the plurality of cables; and
   a second one or more transducers connected to the second water jacket.

7. The system of claim 1, wherein the first electronic device is a room temperature electronic device and the second electronic device is a cryoelectronic device.

* * * * *